C. F. SPERY.
GREASE CUP.
APPLICATION FILED APR. 2, 1917.

1,251,587. Patented Jan. 1, 1918.

WITNESSES:
CH Stark.
A. S. Peterson

INVENTOR:
CHARLES F. SPERY,
BY Michael Stark Sons
ATTORNEYS.

UNITED STATES PATENT OFFICE.

CHARLES F. SPERY, OF CHICAGO, ILLINOIS.

GREASE-CUP.

1,251,587. Specification of Letters Patent. Patented Jan. 1, 1918.

Application filed April 2, 1917. Serial No. 159,184.

*To all whom it may concern:*

Be it known that I, CHARLES F. SPERY, a citizen of the United States, and a resident of the city of Chicago, in the county of Cook and State of Illinois, have invented a certain new and useful Improvement in Grease-Cups; and I do hereby declare the following description of my said invention, taken in connection with the accompanying sheet of drawing, forms a full, clear, and exact specification, which will enable others skilled in the art to which it appertains to make and use the same.

My invention relates generally to improvements in grease cups; and it consists, essentially, in the novel and peculiar combination of parts and details of construction, as hereinafter first fully set forth and described and then pointed out in the claims.

The object of my present invention is the production of an efficient, serviceable, practical, and comparatively cheap lubricating grease cup, such as are almost universally employed on machinery, cars, automobiles, and other motor vehicles. In this class of devices it is desirable that the container of the grease can be readily removed from, and returned to, the part of the cup which is generally permanently secured to that part of a machine that requires lubrication, and at the same time will not be unscrewed by vibration of the machinery on which the grease cup is used. Various devices have been employed to prevent this automatic unscrewing of the cup, which are more or less effective, but I am not aware that one of these devices is as effective, as simple, and as cheaply produced as my present device.

Figure 1:
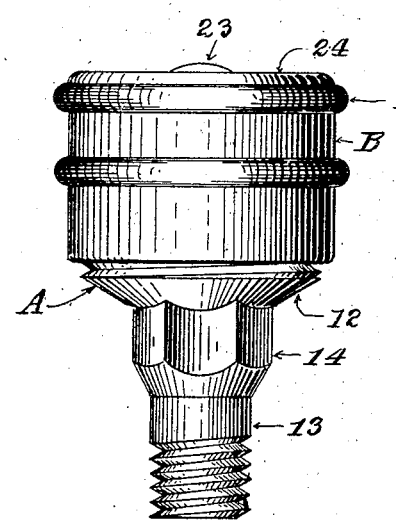
Figure 2:
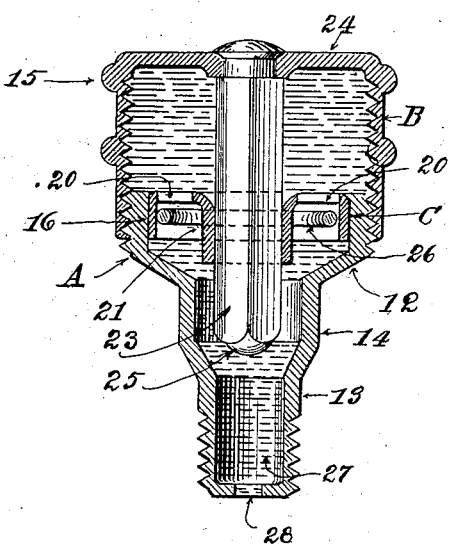
Figure 3:
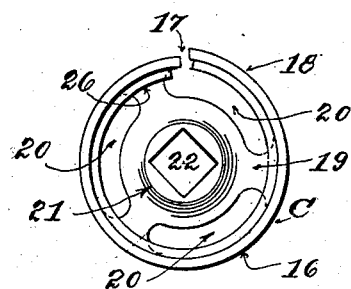
Figure 4:
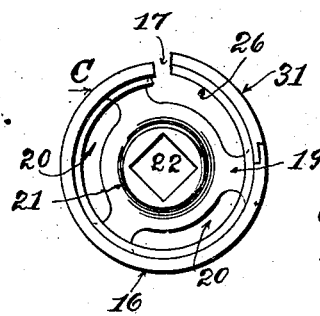

In the drawings which illustrate my invention very fully, Figure 1 is an elevation of my improved grease cup. Fig. 2 is a vertical section of the same. Fig. 3 is a plan of the brake band employed in this device. Fig. 4 is a similar view showing a modified construction of this brake band.

A, designates the male portion of this grease cup. It is a cup-shaped body having, preferably, a flaring, or funnel-shaped extension 12, terminating in a shank 13, which is externally screw-threaded to facilitate the application of the grease cup to that part of a machine which it is desired to lubricate, there being on this body a polygonal section 14, for the application of a wrench by which this body A may be securely screwed to the said part of a machine. The upper part of this body A is externally screw threaded to receive the female portion or cap of this grease cup, which female part B, is a cup-shaped container, internally screw threaded to engage the male thread on the body A, and which cup has externally projecting beads 15, which may be knurled or otherwise roughened to facilitate the manipulation of the container.

Within the cylindrical interior or bore of the upper terminal of the body A, there is rotatably mounted a band C, which has a comparatively deep rim 16, which is split, as at 17, and then a portion of this rim, adjacent to the split, is outwardly bent, as at 18, to destroy the circularity of the rim 16, or in other words, to mutilate this rim for the purpose hereinafter to be referred to. The web 19, of this ring C is perforated, as at 20, and centrally this web 19 has a downwardly extending hub 21, which is punctured by an angular opening 22, for the reception of a correspondingly shaped pin or pintle 23, which is centrally secured to the bottom 24, of the cup B, the lower end of this pintle 23 being pointed or rounded, as as 25, to facilitate the entry of the pin 23 into the angular hole 22 of the band C. Within the rim 16 of the ring C there is placed, if desired, although not absolutely necessary, a spring-wire, split-ring 26, which is shaped to fit the interior contour of the distorted rim 16.

When this ring C is to be placed into the cylindrical bore of the body A, the distorted portion 18 of its rim is forced back to circular form to enable its insertion into the cylindrical bore, but owing to its springiness, or resiliency, this distorted portion 18 has a tendency to resume its distorted contour, and thereby to press with considerable force against the inner wall of this bore, which is more than ample to prevent rotation of the ring C, by vibration or jar, and coincidental therewith, the rotation of the cup B. But to further increase this pressure of the distorted portion 18 against the wall of the cylindrical bore, I insert the distorted split wire-ring 26, into the rim 16, to reinforce the resistance to the inward bending of the distorted portion 18 of said rim.

The function of the pintle 25 is to rotate the split ring C when the cap B is turned; but it accomplishes the further result of serving as a guide to the cap B, when it is to be screwed onto the male portion A, so that the screw threads may properly start, which, in the absence of a pilot pin or other guide, is always more or less difficult to accomplish, especially to an inexperienced hand, and frequently causes the so-called crossing of the threads and the mutilation thereof.

To fill the cup with grease, it is removed from the body A, and after being filled, it is returned to this body by screwing it onto the same. This causes displacement of the grease which will escape through the slots 20 and through the bore of the body A, designated by the numeral 27, to issue from the hole 28 in the lower terminal of the shank 13. Rotating the cup B slightly when lubrication is desired, will force more grease out of the cup until the contents thereof is exhausted and a refilling becomes necessary.

In manufacturing this grease cup it is possible, and probably the most satisfactory, to produce both, the male and the female parts of the cup, in the process of deep drawing from a flat sheet-metal, round, disk of proper thickness; but the brake ring C had best be made in the process of casting from a hard metal possessing a certain degree of resilience and malleability to stand the outward bending and rebending of the distorted portion 18. And since by the now well-developed art of die-casting so-called, it is probably more practical to produce the brake band C by this method, such a ring might possess the necessary resiliency to answer all requirements, but to produce this article by die casting and invest it with the desired resilience in case the metal used in this process is too soft for this purpose, I modify the construction of the ring by omitting therefrom the distorted portion 18 shown in Fig. 3, and substitute in place thereof a separate segment 31, of the rim 16, as illustrated in Fig. 4, and employ the spring 26 to keep the inserted portion in contact with the inner wall of the cylindrical portion of the male part A, in which case the brake ring will be to all intents and purposes as effective as the one shown in Fig. 3.

Attention is now directed to the fact that the cup B, being held to the male portion of the grease cup by the distorted brake ring C, or the inserted segment 31 thereof, reinforced by the wire spring 26, is held thereto by frictional contact with the inner wall of the cylindrical bore of the body A, so snugly that its unscrewing by jars or vibration of the machinery on which the grease cup is used, is practically an impossibility, while it does not interfere in any manner with the screwing on, or the unscrewing of the cap B when this becomes necessary or desirable, to refill the cup.

While I have hereinbefore described the preferred embodiment of my invention, I desire it to be distinctly understood that changes in the details may be made without departing from the scope of my invention as determined by the subjoined claims.

Having thus fully described this invention, I claim as new, and desire to secure to myself by Letters Patent of the United States—

1. A grease cup, comprising, a male part having at one extremity an externally screw-threaded, cylindrical portion with an annular bore, and its other extremity externally screw-threaded for attachment of the device to a part of a machine, a cup in screw-threaded engagement with said male part, an angular pilot pin in said cup, and a brake ring in said annular bore and in engagement with said pilot pin, said brake ring being expansible and constructed to engage the inner, smooth, wall of the cylindrical bore of the upper portion of the male member to frictionally resist the rotation of said cup.

2. A grease cup, comprising a male part having at one extremity an externally screw-threaded, cylindrical portion, said portion having an annular bore, there being at the other end of said male part an externally screw-threaded shank, a cup in screw-threaded engagement with said cylindrical portion, an angular pilot pin in said cup, and a split ring rotatably mounted in said annular bore, a portion of said ring being outwardly bent or distorted to offer resistance to the rotation of said ring and through the angular pilot pin to said cup.

3. A grease cup, comprising a male part, said male part having at one extremity an externally screw-threaded, cylindrical portion, said portion having an annular bore, a cup in screw-threaded engagement with said cylindrical portion, an angular pilot pin in said cup, and a split ring rotatably mounted in said annular bore, a portion of said ring being outwardly bent or distorted to offer resistance to the rotating of said ring, and a split, spring-wire, ring in said split ring constructed to reinforce the resistance of the distorted portion of said split ring to assume circular form.

4. A grease cup, comprising a male part, said male part having at one extremity an externally screw-threaded, cylindrical portion, said portion having a circular bore, a cup in screw-threaded engagement with said circular bore, an angular pilot pin in said cup, and a split ring rotatably mounted in said circular bore, said split ring comprising a web and a rim, there being in said web a central angular passage for the reception of the angular pilot pin, and one or more openings surrounding said angular bore, a portion of said rim being outwardly bent or distorted to offer resistance to the rotation of said split ring.

In testimony that I claim the foregoing as my invention, I have hereunto set my hand.

CHARLES F. SPERY.

Copies of this patent may be obtained for five cents each, by addressing the "Commissioner of Patents, Washington, D. C."